United States Patent
Lin

(10) Patent No.: US 10,971,119 B2
(45) Date of Patent: Apr. 6, 2021

(54) DOUBLE-LAYER DUMB DRUM WITH SAND BELT ADJUSTING FUNCTION

(71) Applicant: Zhangzhou Hanqi Musical Instruments Co., Ltd., Zhangzhou (CN)

(72) Inventor: Tian Fu Lin, Zhangzhou (CN)

(73) Assignee: ZHANGZHOU HANQI MUSICAL INSTRUMENTS CO., LTD., Zhangzhou (CN)

( * ) Notice: Subject to any disclaimer, the term of this patent is extended or adjusted under 35 U.S.C. 154(b) by 0 days.

(21) Appl. No.: 16/609,441

(22) PCT Filed: Mar. 13, 2019

(86) PCT No.: PCT/CN2019/000059
§ 371 (c)(1),
(2) Date: Oct. 29, 2019

(87) PCT Pub. No.: WO2020/042515
PCT Pub. Date: Mar. 5, 2020

(65) Prior Publication Data
US 2020/0273437 A1    Aug. 27, 2020

(30) Foreign Application Priority Data
Aug. 28, 2018 (CN) .......................... 201821395370.X

(51) Int. Cl.
*G10D 13/02* (2020.01)
*G10D 13/20* (2020.01)
*G09B 15/00* (2006.01)

(52) U.S. Cl.
CPC ............. *G10D 13/02* (2013.01); *G10D 13/20* (2020.02); *G09B 15/00* (2013.01)

(58) Field of Classification Search
CPC ......... G10D 13/02; G10D 13/20; G09B 15/00
USPC ........................................................ 84/411 R
See application file for complete search history.

(56) References Cited

U.S. PATENT DOCUMENTS

| 9,466,273 | B2 * | 10/2016 | Krol ....................... G10D 13/18 |
| 2016/0078852 | A1 * | 3/2016 | Nicholson .............. G10D 13/14 |
| | | | 84/411 M |
| 2018/0082667 | A1 * | 3/2018 | Bean ...................... G10D 13/18 |

FOREIGN PATENT DOCUMENTS

| CN | 105679292 A | 6/2016 |
| CN | 107657940 A | 2/2018 |

* cited by examiner

*Primary Examiner* — Jianchun Qin
(74) *Attorney, Agent, or Firm* — Sinorica, LLC

(57) ABSTRACT

A double-layer dumb drum with a sand belt adjusting function includes an upper-layer elastic body, a strike edge, an upper bottom plate, a sand belt adjusting device, an internal resonance chamber, an external resonance chamber, a lower-layer elastic body, and a lower bottom plate. The upper-layer elastic body is fixed to the top of the upper bottom plate; the internal and external resonance chambers are under the upper bottom plate; the sand belt adjusting device is installed in the internal resonance chamber; and the bottom of the internal resonance chamber is sealed by the external resonance chamber. A lower-layer elastic body is fixed to the top of the lower bottom plate; contact points are at the bottom of the external resonance chamber and abut against the top of the lower-layer elastic body; and connecting screws are connected between the upper and lower bottom plates.

3 Claims, 6 Drawing Sheets

DOUBLE-LAYER DUMB DRUM WITH SAND BELT ADJUSTING FUNCTION

FIELD OF INVENTION

The present disclosure relates to the field of musical instrument assisted-teaching, in particular to a double-layer dumb drum with a sand belt adjusting function.

BACKGROUND OF INVENTION

1. Description of the Related Art

At present, various different types of dumb drums are commercially available, but their function is just limited to practicing the hand feel, hitting speed and relational change of the coordination of limbs only. The sound produced by hitting on a drum pad of the dumb drums is very low and does not sound like a real drum, which will affect a beginner's feeling during practice. On the other hand, a military drum can produce deep and cheerful sounds because there is a sand belt installed at the bottom of the military drum, and the sand belt is formed by a plurality of parallel wires capable of resonating with the vibration of the drumhead to achieve the effect of enhancing the performance. However, there is no double-layer dumb drum with an adjustable sand belt structure yet.

2. Summary of the Invention

Therefore, it is a primary objective of the present disclosure to provide a double-layer dumb drum with a sand belt adjusting function, wherein an adjustable sand belt structure is installed onto the dumb drum to achieve the effects of providing a more perfect analog sound of the drum while a drum practitioner is practicing, avoiding too-boring practice, and improving the actual feel of the practice.

To achieve the aforementioned and other objectives, the present disclosure provides a double-layer dumb drum with a sand belt adjusting function comprising an upper-layer elastic body, a strike edge, an upper bottom plate, a sand belt adjusting device, an internal resonance chamber, an external resonance chamber, a lower-layer elastic body, and a lower bottom plate, characterized in that the upper-layer elastic body is fixed to the top of the upper bottom plate, the strike edge is fixed to the top of the upper bottom plate and surrounds the upper-layer elastic body and protrudes from a surface of the upper-layer elastic body; the internal resonance chamber and the external resonance chamber are disposed under the upper bottom plate, and the sand belt adjusting device is installed in the internal resonance chamber, and the bottom of the internal resonance chamber is sealed by the external resonance chamber; the lower-layer elastic body is fixed and coupled to the top of the lower bottom plate, and the bottom of the external resonance chamber has a plurality of contact points, and the external resonance chamber abuts the top of the lower-layer elastic body through the contact points; and the upper bottom plate and the lower bottom plate are coupled and fixed to each other by a plurality of connecting screws.

The sand belt adjusting device comprises a plurality of steel balls, a T-shaped adjusting rod, an adjustment seat, an adjusting knob, and a spring, wherein the steel balls are disposed in the internal resonance chamber; a latitudinal rod at an end of the T-shaped adjusting rod separates the steel balls from an inner wall on a side of the rectangular resonance chamber, a longitudinal rod of the T-shaped adjusting rod is disposed in a slot communicating to the resonance chamber, the tail of the longitudinal rod is coupled to the adjusting knob, and the T-shaped adjusting rod is detachably coupled to the upper bottom plate through the adjustment seat; the steel balls are distributed on both sides of the longitudinal rod of the T-shaped adjusting rod; and a spring is fixed and coupled between the latitudinal rod at an end of the T-shaped adjusting rod and an inner wall of the rectangular resonance chamber.

There are two springs symmetrically disposed on both sides of the longitudinal rod of the T-shaped adjusting rod.

The upper bottom plate and the lower bottom plate are parallelly fixed and coupled to each other.

The present disclosure has the following advantageous effects: The double-layer dumb drum with a sand belt adjusting function of the present disclosure not just provides practices on the hand feel and hitting speed only, but also adjusts the sand belt and simulates the actual sound of a military drum to allow beginners to experience the actual sound effect of the military drum while practicing the dumb drum and feel the actual sound effect in advance in order to expedite the learning process.

The present disclosure will become clearer in light of the following detailed description of an illustrative embodiment of this disclosure described in connection with the drawings, so that people having ordinary skill in the art can implement the present disclosure according to the description of this specification.

BRIEF DESCRIPTION OF NUMERALS USED IN THE FIGURES

1: Strike edge; 2: Upper-layer elastic body; 3: Upper bottom plate; 4; Sand belt adjusting device; 5: External resonance chamber; 6: Steel ball; 7: T-shaped adjusting rod; 8: Spring; 9: Adjustment seat; 10: Adjusting knob; 11: Internal resonance chamber; 12: slot; 13: Lower bottom plate; 14: Lower-layer elastic body; 15: Connecting screw.

DESCRIPTION OF THE PREFERRED EMBODIMENTS

To make it easier for our examiner to understand the objective of the disclosure, its structure, innovative features, and performance, we use a preferred embodiment together with the attached drawings for the detailed description of the disclosure.

Figure 1:
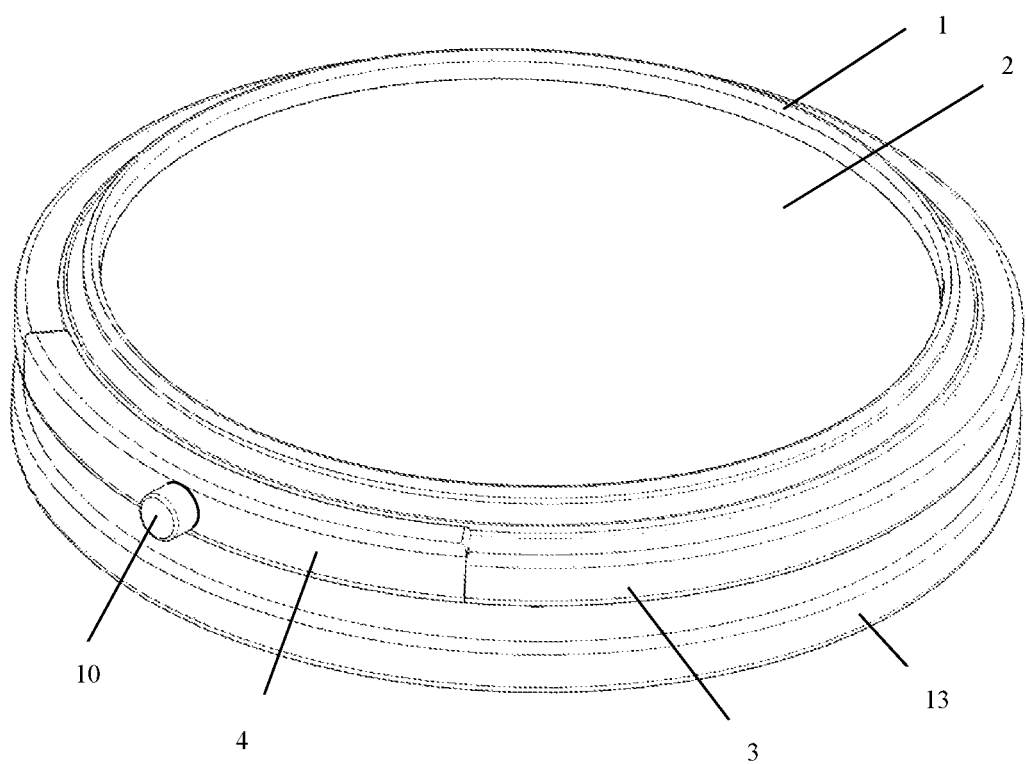
FIG. 1 is a schematic view of the structure of the present disclosure.
Figure 2:
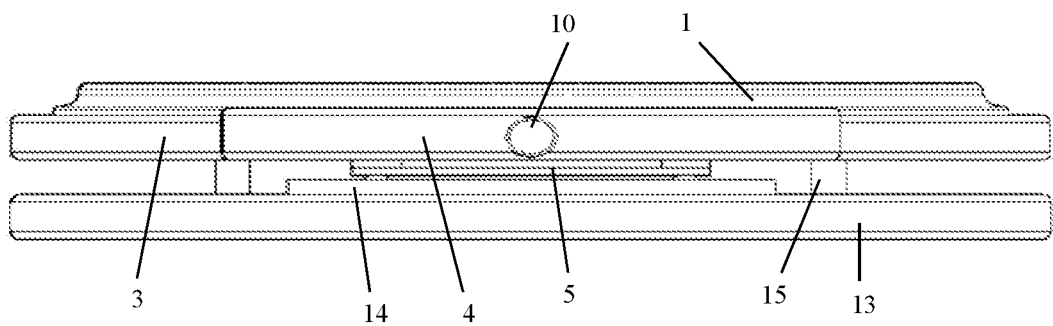
FIG. 2 is a side view of the structure of the present disclosure.
Figure 3:
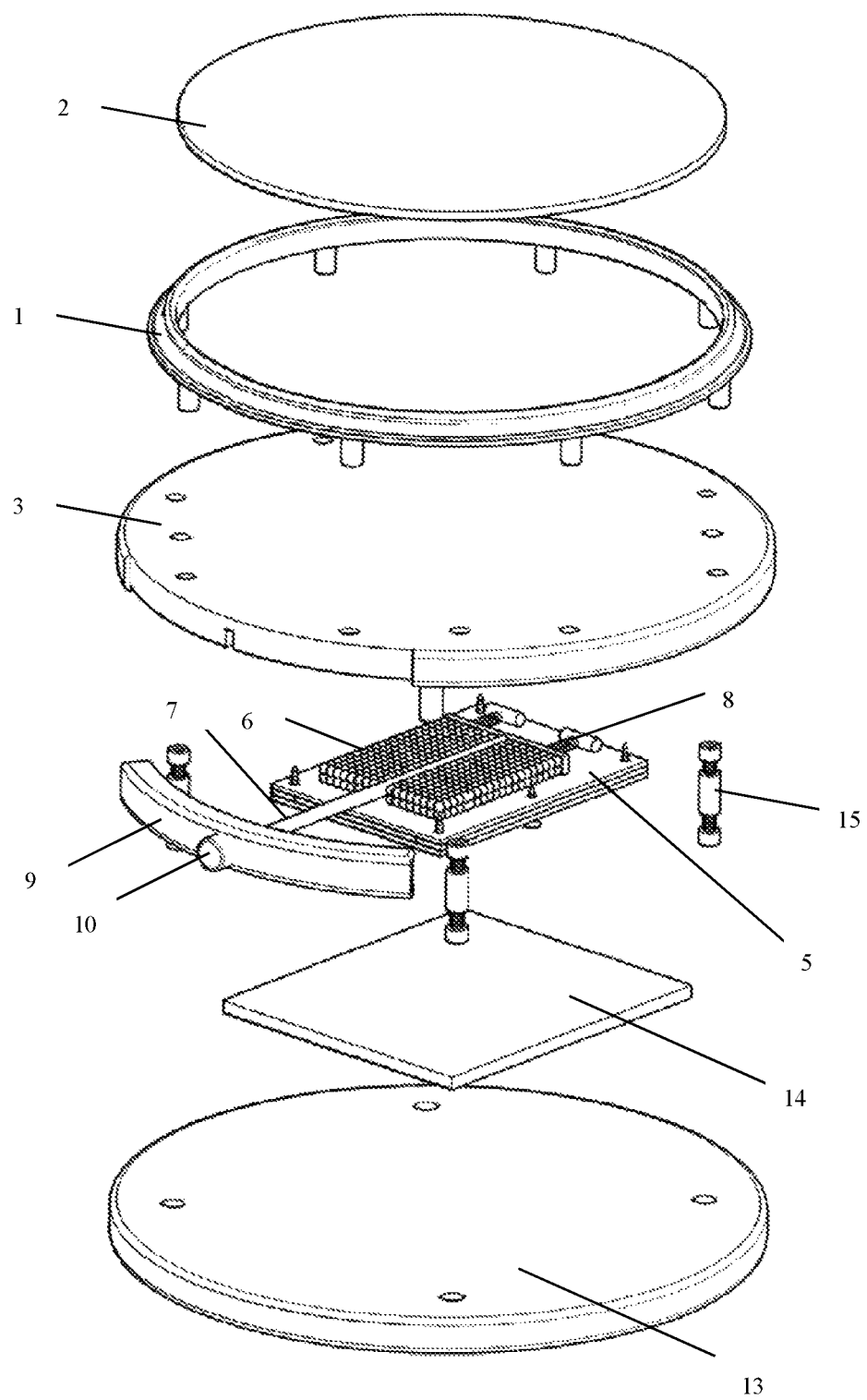
FIG. 3 is an exploded view of the structure of the present disclosure.
Figure 4:
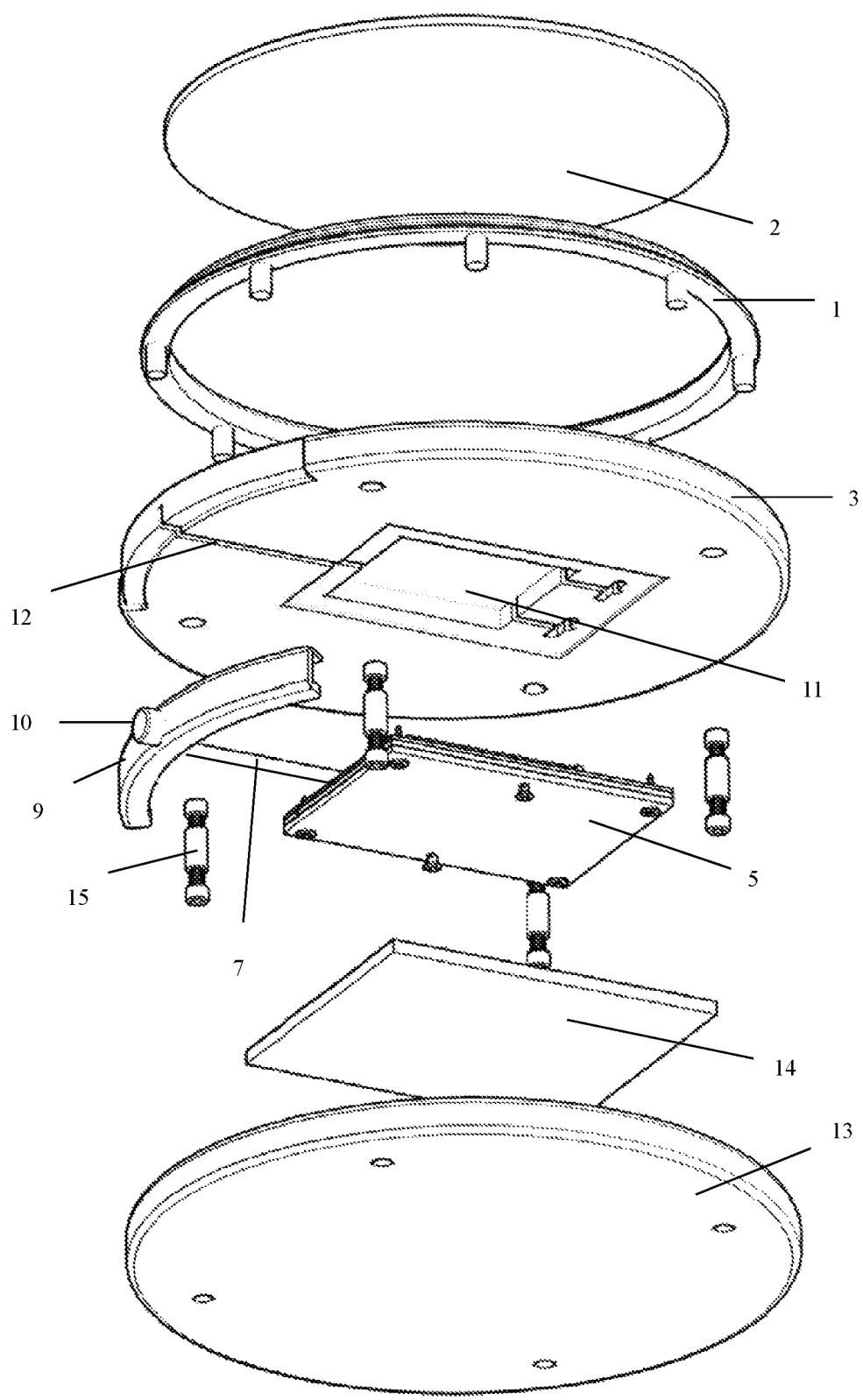
FIG. 4 is another exploded view of the structure of the present disclosure.
Figure 5:
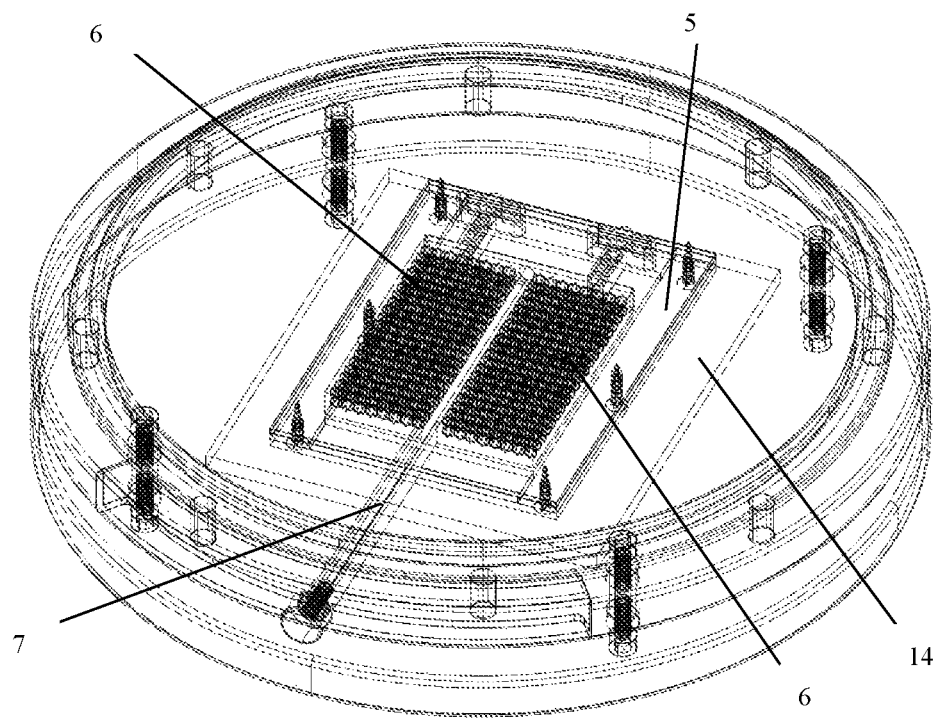
FIG. 5 is a schematic view of the internal structure of the present disclosure.
Figure 6:
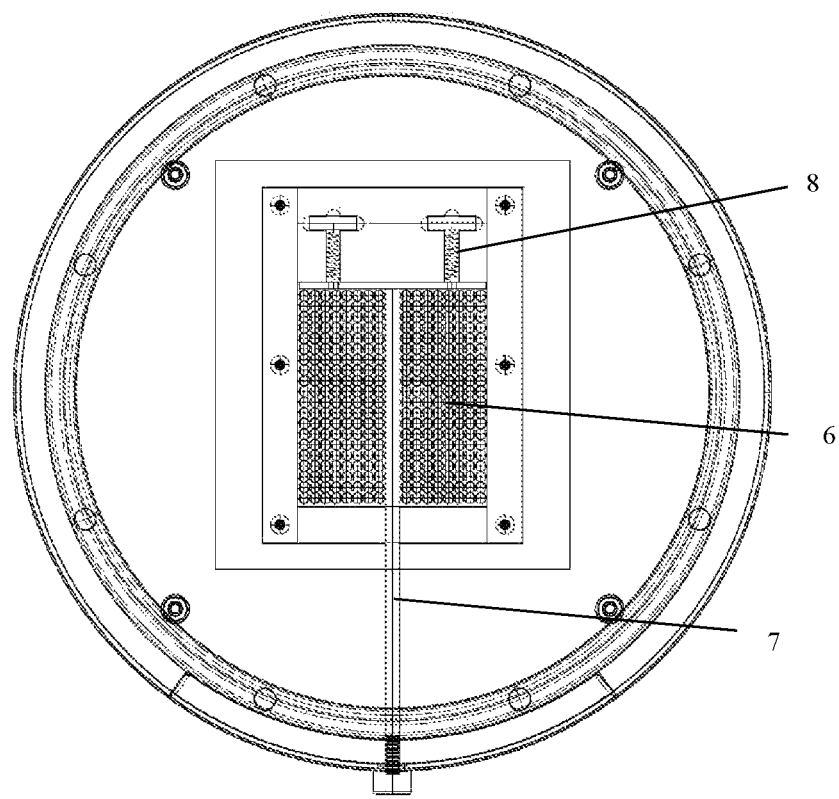
FIG. 6 is a top view of the structure of the present disclosure.

With reference to FIGS. 1 to 6 for a double-layer dumb drum with a sand belt adjusting function in accordance with the present disclosure, the double-layer drum comprises an upper-layer elastic body 2, a strike edge 1, an upper bottom plate 3, a sand belt adjusting device 4, an external resonance chamber 5, a lower-layer elastic body 14, and a lower bottom plate 13, characterized in that the upper-layer elastic body 2 is fixed to the top of the upper bottom plate 3; the strike edge 1 is fixed to the top of the upper bottom plate 3 and surrounds the upper-layer elastic body 2 and protrudes from a surface of the upper-layer elastic body 2; the internal resonance chamber 11 is disposed under the upper bottom plate 3, and the sand belt adjusting device 4 is installed in the internal resonance chamber 11, and the bottom of the internal resonance chamber 11 is sealed by the external resonance chamber 5; a lower-layer elastic body 14 is fixed to the top of the lower bottom plate 13, and the bottom of the external resonance chamber 5 has a plurality of contact points, and the external resonance chamber 5 abuts the top of the lower-layer elastic body 14 through the contact points; and the upper bottom plate 3 and the lower bottom plate 13 are coupled to each other by a plurality of connecting screws 15, and the upper bottom plate 3 and the lower bottom plate 13 are parallel and fixedly coupled to each other.

The sand belt adjusting device 4 comprises a plurality of steel balls 6, a T-shaped adjusting rod 7, an adjustment seat 9, an adjusting knob 10, and a spring 8, and the steel balls 6 are disposed in the rectangular internal resonance chamber 11; the latitudinal rod at an end of the T-shaped adjusting rod 7 separates the steel balls 6 from an inner wall on a side of the rectangular internal resonance chamber 11, and the longitudinal rod of the T-shaped adjusting rod 7 is placed into a slot 12 communicating to the internal resonance chamber 11, and the tail of the longitudinal rod is coupled to the adjusting knob 10, and the T-shaped adjusting rod 7 is detachably coupled to the upper bottom plate 3 through the adjustment seat 9; the steel balls 6 are distributed on both sides of the longitudinal rod of the T-shaped shaped adjusting rod 7; and a spring 8 is fixed and coupled between the top of the latitudinal rod at an end of the T-shaped adjusting rod 7 and an inner wall of the rectangular resonance chamber 11. Wherein, there are two springs 8 symmetrically distributed on both sides of the longitudinal rod of the T-shaped adjusting rod 7.

The double-layer dumb drum with a sand belt adjusting function in accordance with the present disclosure, the adjusting knob 10 may be turned to move the T-shaped adjusting rod 7 forward or backward to adjust the tightness of the arrangement of the steel balls 6 in the resonance chamber 11, so as to change the size of the internal resonance chamber 11 and achieve the looseness or compactness of the sound density of the sand belt structure, and the sound is transmitted through the contact points of the external resonance chamber 5 to the lower-layer elastic body at the bottom to improve the sound quantity and quality, and finally achieve a more analog sound of a real drum. When the T-shaped adjusting rod 7 moves forward, the arrangement of the steel balls 6 becomes loosened, and the internal resonance chamber 11 becomes larger. When a drum practitioner hits the upper-layer elastic body 2 or the strike edge 1, the sound produced by the sand belt structure has a loosened sound density. When the T-shaped adjusting rod 7 moves backward, the T-shaped adjusting rod 7 presses the steel balls 6 move closely with each other, and the arrangement of the steel balls 6 becomes more compact gradually, and the resonance chamber 11 is compressed to become smaller. When the drum practitioner hits an upper-layer elastic body 2 or a strike edge 1 made of silicone, the sound produced by the sand belt structure becomes more compact. A spring installed between the latitudinal rod at an end of the T-shaped adjusting rod 7 and an inner wall of the resonance chamber 11 provides an effect of restoring the position of the T-shaped adjusting rod 7.

When the drum practitioner hits the upper-layer elastic body 2 or the strike edge 1, the sound produced by the upper-layer elastic body 2, the sand belt adjusting device 4 and the external resonance chamber 5 is transmitted through the contact points of the external resonance chamber 5 to the lower-layer elastic body 14 to produce resonance, so that the double-layer dumb drum can produce sounds simulated to those of a real drum with a crispy and thick nature.

While the disclosure has been described by means of specific embodiments, numerous modifications and variations could be made thereto by those skilled in the art without departing from the scope and spirit of the disclosure set forth in the claims.

What is claimed is:

1. A double-layer dumb drum with a sand belt adjusting function, comprising an upper-layer elastic body, a strike edge, an upper bottom plate, a sand belt adjusting device, an internal resonance chamber, an external resonance chamber, a lower-layer elastic body, and a lower bottom plate, characterized in that the upper-layer elastic body is fixed to the top of the upper bottom plate, the strike edge is fixed to the top of the upper bottom plate and surrounds the upper-layer elastic body and protrudes from an upper elastic surface; the internal resonance chamber and the external resonance chamber are disposed under the upper bottom plate, and the sand belt adjusting device are installed in the internal resonance chamber, and the bottom of the internal resonance chamber is sealed by the external resonance chamber; the lower-layer elastic body is fixed and coupled to the top of the lower bottom plate; the bottom of the external resonance chamber has a plurality of contact points, and the external resonance chamber abuts the bottom of the lower-layer elastic body through the contact points; and the upper bottom plate and the lower bottom plate are coupled and fixed by a plurality of connecting screws;

the sand belt adjusting device comprises a plurality of steel balls, a T-shaped adjusting rod, an adjustment seat, an adjusting knob, and a spring, and the steel balls are disposed in the internal resonance chamber; the latitudinal rod at an end of the T-shaped adjusting rod separates the steel balls from an inner wall on a side of the rectangular resonance chamber; the longitudinal rod of the T-shaped adjusting rod is placed into a slot communicating to the resonance chamber; the tail of the longitudinal rod is coupled to the adjusting knob; the T-shaped adjusting rod is detachably coupled to the upper bottom plate through the adjustment seat; the steel balls are distributed on both sides of the longitudinal rod of the T-shaped adjusting rod; and a spring is fixed and coupled between the latitudinal rod at the end of the T-shaped adjusting rod and an inner wall of the rectangular resonance chamber.

2. The double-layer dumb drum with a sand belt adjusting function according to claim 1, wherein the spring comes with a quantity of two, and the two springs are disposed symmetrically and respectively on both sides of the longitudinal rod of the T-shaped adjusting rod.

3. The double-layer dumb drum with a sand belt adjusting function according to claim 1, wherein the upper bottom plate and the lower bottom plate are parallel fixed and coupled to each other.

* * * * *